US008687019B2

(12) United States Patent
Kubota et al.

(10) Patent No.: US 8,687,019 B2
(45) Date of Patent: Apr. 1, 2014

(54) COMPOSITE MULTI-IMAGE DISPLAY DEVICE, COMPOSITE MULTI-IMAGE INFORMATION PROCESSING DEVICE, COMPOSITE MULTI-IMAGE DISPLAY SYSTEM, COMPOSITE MULTI-IMAGE DISPLAY METHOD, AND COMPOSITE MULTI-IMAGE FORMATION PROCESSING METHOD

(75) Inventors: Mitsuru Kubota, Matsumoto (JP); Issei Yokoyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 381 days.

(21) Appl. No.: 13/072,067

(22) Filed: Mar. 25, 2011

(65) Prior Publication Data

US 2011/0234632 A1 Sep. 29, 2011

(30) Foreign Application Priority Data

Mar. 29, 2010 (JP) ................................ 2010-074200

(51) Int. Cl.
*G09G 5/00* (2006.01)
*G06F 3/00* (2006.01)

(52) U.S. Cl.
USPC .......................................... 345/629; 715/733

(58) Field of Classification Search
CPC ................. G09G 2370/20; G09G 5/14; G06T 2219/024; G06F 3/1423; G06F 3/033
See application file for complete search history.

(56) References Cited

U.S. PATENT DOCUMENTS

2005/0128530 A1 6/2005 Aiba et al.
2006/0038741 A1 2/2006 Mori et al.
2008/0094311 A1* 4/2008 Garbey et al. .................. 345/1.3
2009/0043899 A1* 2/2009 Kubota .......................... 709/228
2009/0122011 A1* 5/2009 Timokhin et al. ............. 345/163
2009/0282359 A1* 11/2009 Saul et al. ...................... 715/784
2010/0064260 A1 3/2010 Amano
2010/0097315 A1* 4/2010 Garibaldi et al. ............. 345/157
2010/0257450 A1* 10/2010 Go et al. ....................... 715/733

FOREIGN PATENT DOCUMENTS

JP A-2006-59251 3/2006
JP 2008-191354 A 8/2008
JP A-2008-234501 10/2008

* cited by examiner

*Primary Examiner* — Carlos Perromat
(74) *Attorney, Agent, or Firm* — Oliff, PLC

(57) ABSTRACT

An image display system includes an image display device and an image information processing device. The image display device includes a display side input section receiving a plurality of pieces of image information and cursor position information, an image combining/displaying section for displaying a composite image of the plurality of pieces of image information, and a cursor display section for displaying a cursor based on the cursor position information. The image information processing device includes an output section for outputting the image information and the cursor position information, a processing side input section for receiving input of composite image information, and a cursor position information processing section selecting either of a first cursor correspondence process corresponding to the image information sent to the image display device and a second cursor correspondence process corresponding to the composite image information and then performing the cursor correspondence process thus selected.

17 Claims, 6 Drawing Sheets

COMPOSITE MULTI-IMAGE DISPLAY DEVICE, COMPOSITE MULTI-IMAGE INFORMATION PROCESSING DEVICE, COMPOSITE MULTI-IMAGE DISPLAY SYSTEM, COMPOSITE MULTI-IMAGE DISPLAY METHOD, AND COMPOSITE MULTI-IMAGE FORMATION PROCESSING METHOD

CROSS-REFERENCE

The entire disclosure of Japanese Patent Application No. 2010-074200 filed Mar. 29, 2010 is expressly incorporated by reference herein.

BACKGROUND

1. Technical Field

The present invention relates to an image display device for displaying a composite image of two or more images, an image information processing device for outputting the image information to the image display device, and an image display system provided with the both devices.

2. Related Art

The image display system provided with the both devices, namely the image display device and the image information processing device, is called a multi-monitor system, and is becoming in frequent use. In such a multi-monitor system, it is common that the image in a personal computer (hereinafter referred to as PC) as an example of the image information processing device is displayed on two or more monitors, and a variety of methods of improving the operability of the cursor in such a case have been proposed (e.g., JP-A-2008-234501 (Document 1) and JP-A-2006-59251 (Document 2)).

According to these documents, although the improvement in the operability of the cursor on the premise of the respective image display in two or more monitors can be provided, it is not assumed that a plurality of images are combined and then displayed. Therefore, the improvement therefor has been required.

In presentations, for example, the presenter displays the image, which is displayed on the PC, on an image display device such as a large monitor or a projector while operating the PC, thereby presenting the PC image to the audience. On this occasion, it is probable that a plurality of images from the PCs is combined in the image display device, and is then presented to the audience. However, in actual status, it seems difficult for the cursor display method proposed in the documents mentioned above to improve the operability of the cursor in such circumstances.

SUMMARY

An advantage of some aspects of the invention is to achieve the improvement of the operability of the cursor in the case of using the image display device for display a plurality of images as a composite image together with the image information processing device such as a PC.

According to an aspect of the invention, there is provided an image display system including an image display device adapted to display a composite image having a plurality of images combined, and at least one image information processing device adapted to output image information for image display to the image display device, wherein the image display device includes a display side input section adapted to receive a plurality of inputs of image information from the at least one image information processing device adapted to output the image information for the image display and at least one input of cursor position information necessary for displaying a cursor from the at least one of image information processing device, an image combining/displaying section adapted to create a composite image based on the image information inputs received by the display side input section, and display the composite image, and a cursor display section adapted to perform display of the cursor based on the cursor position information input received by the display side input section, the image information processing device includes an output section adapted to output the cursor position information necessary for displaying the cursor in the image display device to the display side input section of the image display device together with the image information, a processing side input section adapted to receive an input of composite image information with respect to the composite image created by the image display device with the image combining/displaying section, and a cursor position information processing section adapted to select either of a first cursor correspondence process adapted to make the cursor position information correspond to an image based on the image information output to the image display device and a second cursor correspondence process adapted to make the cursor position information correspond to the composite image based on the composite image information input, and perform the selected correspondence process when outputting the cursor position information to the image display device, and the cursor display section of the image display device displays the cursor in a first display mode of displaying the cursor in a display range of an image based on the image information from the image information processing device in an overlapping manner when the cursor position information by the first cursor correspondence process is input, and displays the cursor in a second display mode of displaying the cursor in a display range of the entire composite image in an overlapping manner when the cursor position information by the second cursor correspondence process is input.

In the image display system provided with the configuration described above, the image display device creates the composite image based on the plurality of image information inputs received, and then displays the composite image. Further, when displaying the cursor on the composite image displayed based on the cursor position information, the image display device provided with the configuration described above selects either one of the first cursor display mode and the second cursor display mode, and then displays the cursor so as to overlap the composite image in the display mode thus selected.

In the first cursor display mode, the cursor is displayed so as to overlap the composite image in the display range (hereinafter referred to as a cursor output processing device image display range) of the image based on the image information with respect to the image information processing device outputting the cursor position information. In other words, the cursor is displayed in the cursor output processing device image display range in the composite image. The image in the cursor output processing device image display range is the display image in the image information processing device, which has output the cursor position information, and in the image information processing device, the cursor display is performed within the range of this display image. Therefore, in the first cursor display mode, it results that the cursor display based on the user operation in the image information processing device outputting the cursor position information and the cursor display within the cursor output processing device image display range in the composite image in the image display device are the same in the cursor display position and how the cursor moves. In the second cursor display mode, the cursor is displayed so as to overlap the composite image within the display range of the entire composite image combined by the image display device. As a result, according to the image display device having the configuration described above, by appropriately selecting and using the first and second display modes, the cursor display performed by displaying the cursor so as to overlap the composite image of the image display device can be diversified, and it becomes possible to provide enhancement of the cursor operability.

On this occasion, by arranging that the image information inputs are received from the respective image information processing devices, it is possible to appropriately use the cursor display modes described above after combining the images in the image information processing devices by the image display device, and then displaying the composite image by the image display device. Further, it is possible to arrange that the cursor position information input is received from selected one of the image information processing devices. According to such a configuration, it is possible to match the cursor display in the display image in the selected image information processing device and the cursor display in the cursor output processing device image display range in the composite image with each other. Besides the above, by arranging that the selection of the display mode is performed based on the instruction of the image information processing device which has output the cursor position information, it is possible to make the cursor display selection in the composite image fit in the intention of the user of the image information processing device.

Besides the above, the image display device described above can take the forms described as follows. For example, it can be arranged that the composite image information for displaying the composite image is output to the image information processing device outputting the cursor position information. It becomes possible for the image information processing device having received the composite image information to display the image output by the image information processing device itself to the image display device and to display the composite image based on the composite image information output to and received by the image information processing device. Therefore, it becomes possible to make the cursor display in the composite image combined and displayed by the image display device fit in the intention of the user of the image information processing device receiving the output of the composite image information, and thus, the cursor operability is further enhanced. For example, if the user of the image information processing device outputting the cursor position information performs the cursor operation in the image, which is the display image of the image information processing device and is output to the image display device, the cursor position information regarding the cursor operation is output to the image display device, and the cursor is displayed within the cursor output processing device image display range in the composite image (the first cursor display mode). On the other hand, if the user of the image information processing device outputting the cursor position information performs the cursor operation in the composite image displayed based on the composite image information, which is output to and received by the image information processing device, the cursor position information regarding the cursor operation is output to the image display device, and the cursor is displayed within the display range of the entire composite image (the second cursor display mode). In other words, when the user performs the cursor operation in the image information processing device, the correspondence relationship between the image displayed in the image information processing device and the cursor display can be reproduced in the composite image displayed by the image display device, and thus enhancement of the cursor operability and a variety of cursor display patterns fitting in the intention of the user can be achieved.

In the image display system provided with the configuration described above, the image information processing device diversifies the cursor display of displaying the cursor so as to overlap the composite image of the image display device, and provides the enhancement of the cursor operability.

By arranging that the selection between the first cursor correspondence process and the second cursor correspondence process is performed based on the operation of the image information processing device by the user, it is possible to make the cursor display selection in the composite image fit in the intention of the user of the image information processing device via the selection and the execution of the cursor correspondence process based on the user operation of the image information processing device.

By performing the coordinate conversion, which corresponds to comparison between an image based on image information to be output to the image display device and the composite image, on the cursor position information in the first cursor correspondence process, thereby performing the second cursor correspondence process, the second cursor correspondence process becomes easy.

The invention can be applied to the image display method of displaying the cursor so as to overlap the composite image when displaying the composite image having a plurality of images combined with each other in the image display device. For example, in an image display method in an image display device adapted to display a composite image having a plurality of images combined, it is possible to include the steps of (a) receiving a plurality of inputs of image information from at least one image information processing device adapted to output the image information for the image display and at least one input of cursor position information necessary for displaying a cursor from the at least one of image information processing device, (b) creating a composite image based on the image information inputs received in step (a), (c) displaying the composite image, (d) selecting, prior to step (e), either one of a first cursor display mode of displaying the cursor in a display range of an image based on the image information with respect to the image information processing device outputting the cursor position information in an overlapping manner, and a second cursor display mode of displaying the cursor in a display range of the entire composite image in an overlapping manner, and (e) performing the cursor display in the display mode selected in step (d).

Further, the invention can be applied to the image information processing method of displaying the cursor so as to overlap the composite image in the image display device while outputting the image information necessary for displaying the composite image to the image display device for displaying the composite image having a plurality of images combined with each other. For example, in an image information processing method adapted to output image information for image display to an image display device adapted to display a composite image having a plurality of images combined, it is possible to include the steps of (p) outputting the cursor position information necessary for displaying a cursor in the image display device to the image display device together with the image information, (q) receiving, from the image display device, an input of composite image information with respect to a composite image combined by the image display device based on a plurality of image information inputs received by the image display device from at least one image information processing device, (r) selecting, upon outputting the cursor position information to the image display device, either of a first cursor correspondence process adapted to make the cursor position information correspond to an image based on the image information output to the image display device and a second cursor correspondence process adapted to make the cursor position information correspond to the composite image based on the composite image information input, and (s) performing the cursor correspondence process selected in step (r).

According to another aspect of the invention, there is provided an image display device adapted to display a composite image having a plurality of images combined, including an input section adapted to receive a plurality of inputs of image information from the at least one image information processing device adapted to output the image information for the image display and at least one input of cursor position information necessary for displaying a cursor from the at least one of image information processing device, an image combining/displaying section adapted to create a composite image based on the image information inputs received by the input section, and display the composite image, and a cursor display section adapted to select either one of a first cursor display mode of displaying the cursor in a display range of an image based on the image information with respect to the image information processing device outputting the cursor position information in an overlapping manner, and a second cursor display mode of displaying the cursor in a display range of the entire composite image in an overlapping manner, and to perform the cursor display in the selected display mode when performing the display of the cursor based on the cursor position information received in the input section.

According to still another aspect of the invention, there is provided an image information processing device adapted to output image information for image display to an image display device adapted to display a composite image having a plurality of images combined, including an output section adapted to output the cursor position information necessary for displaying the cursor in the image display device to the image display device together with the image information, an input section adapted to input, from the image display device, an input of composite image information with respect to a composite image combined by the image display device based on a plurality of image information inputs received by the image display device from at least one image information processing device, and a cursor position information processing section adapted to select either of a first cursor correspondence process adapted to make the cursor position information correspond to an image based on the image information output to the image display device and a second cursor correspondence process adapted to make the cursor position information correspond to the composite image based on the composite image information input, and perform the selected correspondence process when outputting the cursor position information to the image display device.

Besides the above, the invention can be applied to a cursor display method of making cursor display in a composite image of an image display device adapted to combine a plurality of images and display the composite image as the cursor display corresponding to a plurality of image information processing devices adapted to output image information for image display to the image display device.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Figure 1:
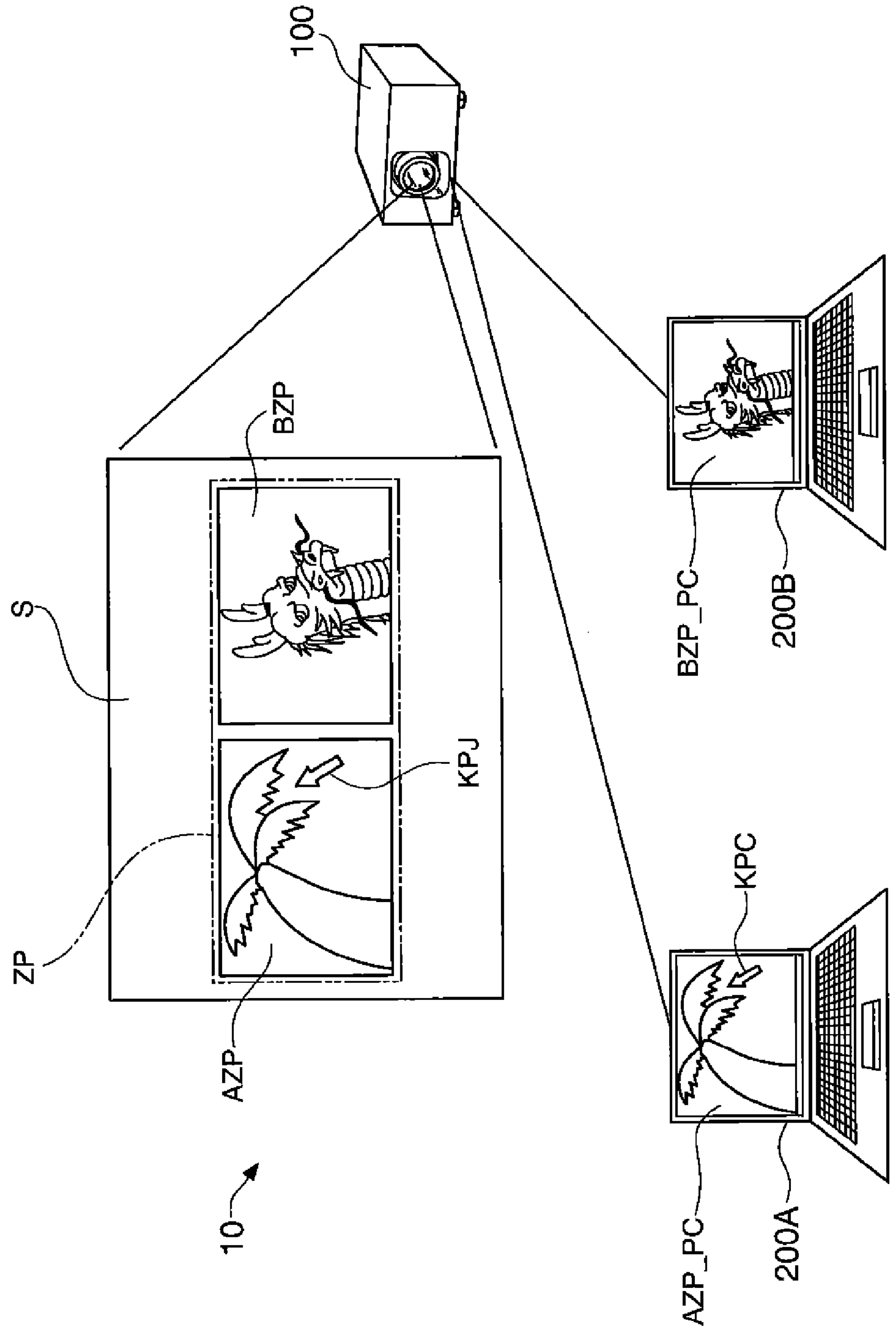
FIG. 1 is an explanatory diagram schematically showing an overall configuration of an image display system 10.

An embodiment of the invention will hereinafter be explained taking the case of applying the invention to an image display system using a projector (PJ) and a personal computer (PC) in cooperation with each other as an example. FIG. 1 is an explanatory diagram schematically showing an overall configuration of the image display system 10, and FIG. 2 is an explanatory diagram showing a device for constituting the image display system 10 with a functional block diagram.

As shown in FIG. 1, the image display system 10 is provided with a projector 100 as the image display device, and two PCs 200A, 200B as the image information processing devices. The projector 100 is connected to the two PCs 200A, 200B so as to be able to perform mutual data communication, and receives image information inputs from the respective PCs. Therefore, the projector 100 displays a composite image ZP, which is obtained by combining the images based on the respective image information inputs received from the PCs so that the both images are arranged side by side, on a screen S by projection. The composite image ZP includes a reflection image AZP reflecting a PC image AZP_PC displayed on a display screen attached to the PC 200A and a reflection image BZP reflecting a PC image BZP_PC displayed on a display screen attached to the PC 200B arranged side by side, and the relationship between these images will be described later. The projector 100 also receives cursor position information inputs necessary for displaying a cursor KPJ from the respective PCs 200A, 200B, which will also be described later.

The both PCs, the PC 200A and the PC 200B, start application software based on the operations of the users, and then display the images corresponding to the image data controlled by the software on the respective display screens attached thereto as the PC image AZP_PC and the PC image BZP_PC, respectively. Since the both PCs calculate the cursor coordinates in the display screen in accordance with the mouse operations or the keyboard operations by the users, and then generate the cursor coordinates thus calculated as the cursor position information in conjunction with such image display, the PC 200A displays the cursor KPC on the display screen so as to overlap the PC image AZP_PC. The same is applied to the PC 200B. In the present embodiment, the outputs of the cursor position information to the projector 100 are prioritized, and the PC 200A has priority over the PC 200B. Therefore, since the PC 200A also outputs the cursor position information to the projector 100 as described later, the projector 100 displays the cursor KPJ so as to overlap the composite image ZP, on the screen S based on the cursor position information.

Figure 2:
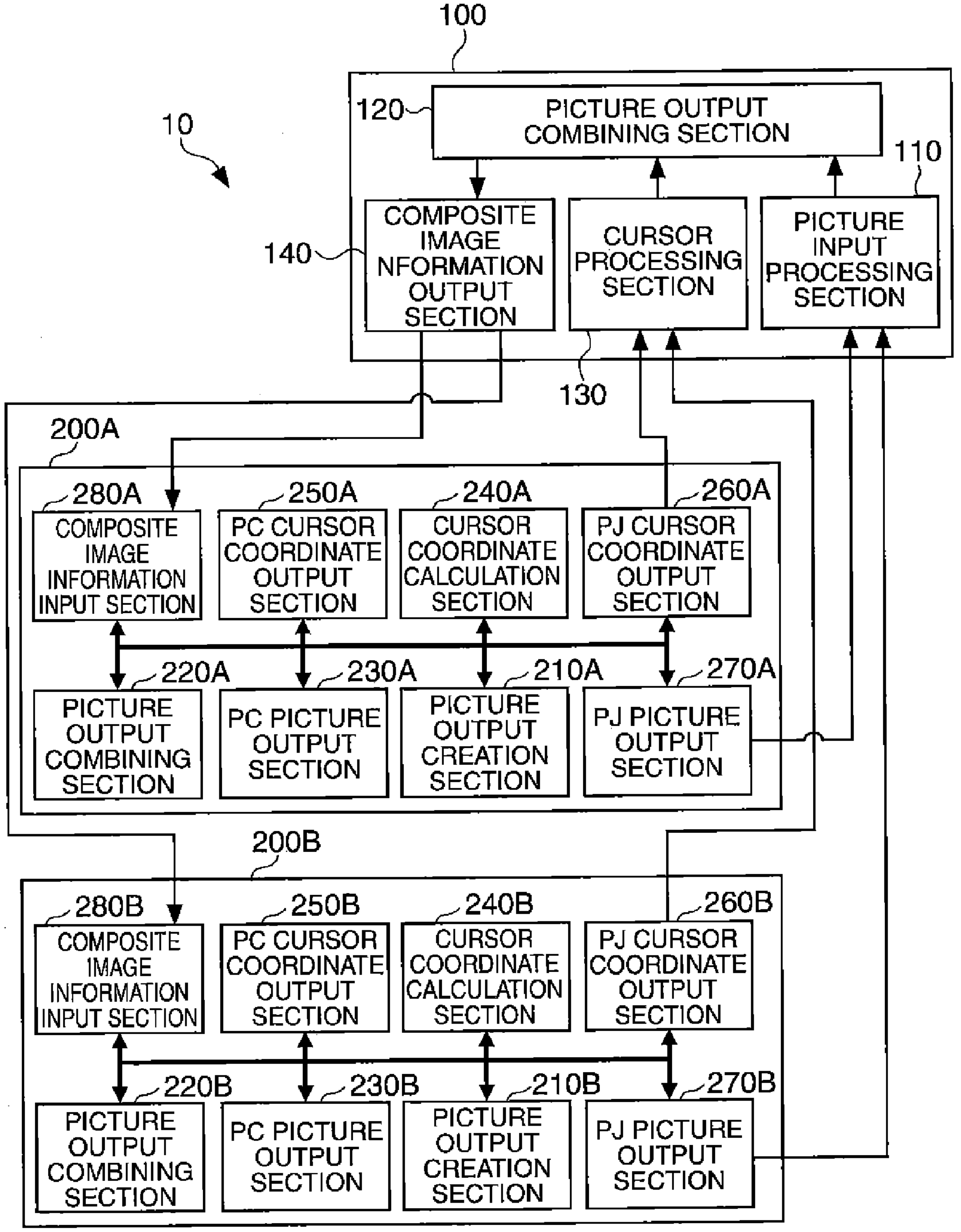
FIG. 2 is an explanatory diagram showing a device constituting the image display system 10 with a functional block diagram.

As shown in FIG. 2, the projector 100 is provided with a picture input processing section 110, a picture output combining section 120, a cursor processing section 130, and a composite image information output section 140. The picture input processing section 110 receives the image information inputs for respectively displaying the PC image AZP_PC and the PC image BZP_PC described above from the both PCs, the PC 200A and the PC 200B.

The picture output combining section 120 receives the image information regarding the PC image AZP_PC and the PC image BZP_PC input by the picture input processing section 110, then performs a predetermined combining/displaying process on the information on both of the images, then generates the composite image obtained by combining the reflection image AZP reflecting the PC image AZP_PC and the reflection image BZP reflecting the PC image BZP_PC so as to be arranged side by side, and then displays the composite image thus generated on the screen S. The combining/displaying process performed by the picture output combining section 120 can be arranged to be set in consideration of the horizontal and vertical sizes of the screen S, the aspect ratios of the images of the respective PCs, the size ratio between the PC images when displaying the PC images so as to be arranged side by side, and so on. For example, the composite image ZP is created by arranging the PC image AZP_PC and the PC image BZP_PC side by side laterally in the display area of the screen S while keeping the respective aspect ratios, and then zooming them so that both of the PC images are fitted in the lateral size of the screen S.

By passing through such a combining/displaying process, it results that the composite image ZP is displayed including the reflection image AZP reflecting the PC image AZP_PC and the reflection image BZP reflecting the PC image BZP_PC. The arrangement of the PC images is not limited to the lateral arrangement, but can be a vertical arrangement or an oblique arrangement, and the projector 100 displays the composite image created by the picture output combining section 120 in accordance with such an arrangement of the images.

The cursor processing section 130 receives input of the cursor position information for displaying the cursor KPJ so as to overlap the composite image ZP from the PC 200A. The picture output combining section 120 performs the image combining/displaying process described later on the cursor position information input by the cursor processing section 130 to thereby display the cursor KPJ so as to overlap the composite image ZP. As described above, in the present embodiment, since the PC 200A has priority, the cursor position information is output from the PC 200A to the cursor processing section 130, it is also possible to arrange that the cursor position information is input from the PC 200B. In the case in which the cursor position information inputs are received from the both PCs as described above, it is also possible to provide the cursor KPJ for each of the PCs and to perform the display control on the cursors KPJ individually in accordance with the cursor position information from the respective PCs besides the method of prioritizing the inputs.

The composite image information output section 140 outputs the composite image information for displaying the composite image ZP created by the picture output combining section 120 to the PC 200A and the PC 200B. As described later, although the composite image information is used for displaying the composite image ZP on the display screen of PC 200A, there is a low necessity for the PC to display the same composite image as in the projector 100.

Therefore, it is also possible for the composite image information output section 140 to form the composite image information for displaying the composite image ZP to be the image information (layout image information) enough for displaying the layout of the composite image ZP and the reflection image AZP and the reflection image BZP included in the composite image ZP while omitting the details of the image.

The picture input processing section 110 and so on explained above are configured to perform the functions described above by a CPU, a ROM, and a RAM of a control device not shown provided to the projector 100, and further by executing a control program stored in the ROM, and these constituents constitute the image combining/displaying section, the input section, and so on in the invention alone or in cooperation with each other.

The PC 200A has a picture output creation section 210A, a picture output combining section 220A, a PC picture output section 230A, a cursor coordinate calculation section 240A, a PC cursor coordinate output section 250A, a PJ cursor coordinate output section 260A, a PJ picture output section 270A, and a composite image information input section 280A so as to be able to perform data communication with each other. The picture output creation section 210A creates the output image information necessary for displaying the image corresponding to the application software started by the user so as to display the image on the display screen attached to the PC 200A. The picture output combining section 220A outputs the image information created by the picture output creation section 210A to the PC picture output section 230A, and the PC picture output section 230A outputs the image information to the display screen attached to the PC 200A. Thus, the PC 200A displays the image (the PC image AZP_PC) corresponding to the application software on the display screen attached (see FIG. 1). The cursor coordinate calculation section 240A calculates the coordinate of the cursor display position based on the mouse operation by the user, and the PC cursor coordinate output section 250A outputs the cursor coordinate thus calculated to the display screen attached to the PC 200A via the picture output combining section 220A. Thus, the PC 200A displays the cursor KPC so as to overlap the PC image AZP_PC displayed on the display screen attached (see FIG. 1).

The PJ cursor coordinate output section 260A includes the coordinate of the cursor display position, which the cursor coordinate calculation section 240A has calculated based on the mouse operation by the user, in the cursor position information for displaying the cursor KPJ in the composite image ZP in the projector 100, and outputs it to the cursor processing section 130. Further, the PJ cursor coordinate output section 260A performs the coordinate conversion on the coordinate of the cursor display position in the manner described later, and then outputs the cursor display information after the coordinate conversion to the cursor processing section 130.

The PJ picture output section 270A outputs the image information of the PC image AZP_PC displayed by the PC 200A on the display screen attached thereto with the PC picture output section 230A to the picture input processing section 110 as the image information for displaying the PC image AZP_PC so as to be included in the composite image ZP in the projector 100. The picture output creation section 210A and so on explained above are configured to perform the functions described above by a CPU, a ROM, and a RAM of a control device not shown provided to the PC 200A, and further by executing a control program stored in the ROM, and these constituents constitute the cursor position information processing section, the input section, and so on in the invention alone or in cooperation with each other. The same is applied to the PC 200B.

The picture input processing section 110 and the cursor processing section 130 of the projector 100 receive such an output, and then perform the picture input process and the cursor process as described above. The picture output combining section 120 combines the reflection image AZP reflecting the PC image AZP_PC of the PC 200A and the reflection image BZP reflecting the PC image BZP_PC of the PC 200B arranged side by side as described above to form the composite image ZP, and displays it.

Figure 3:
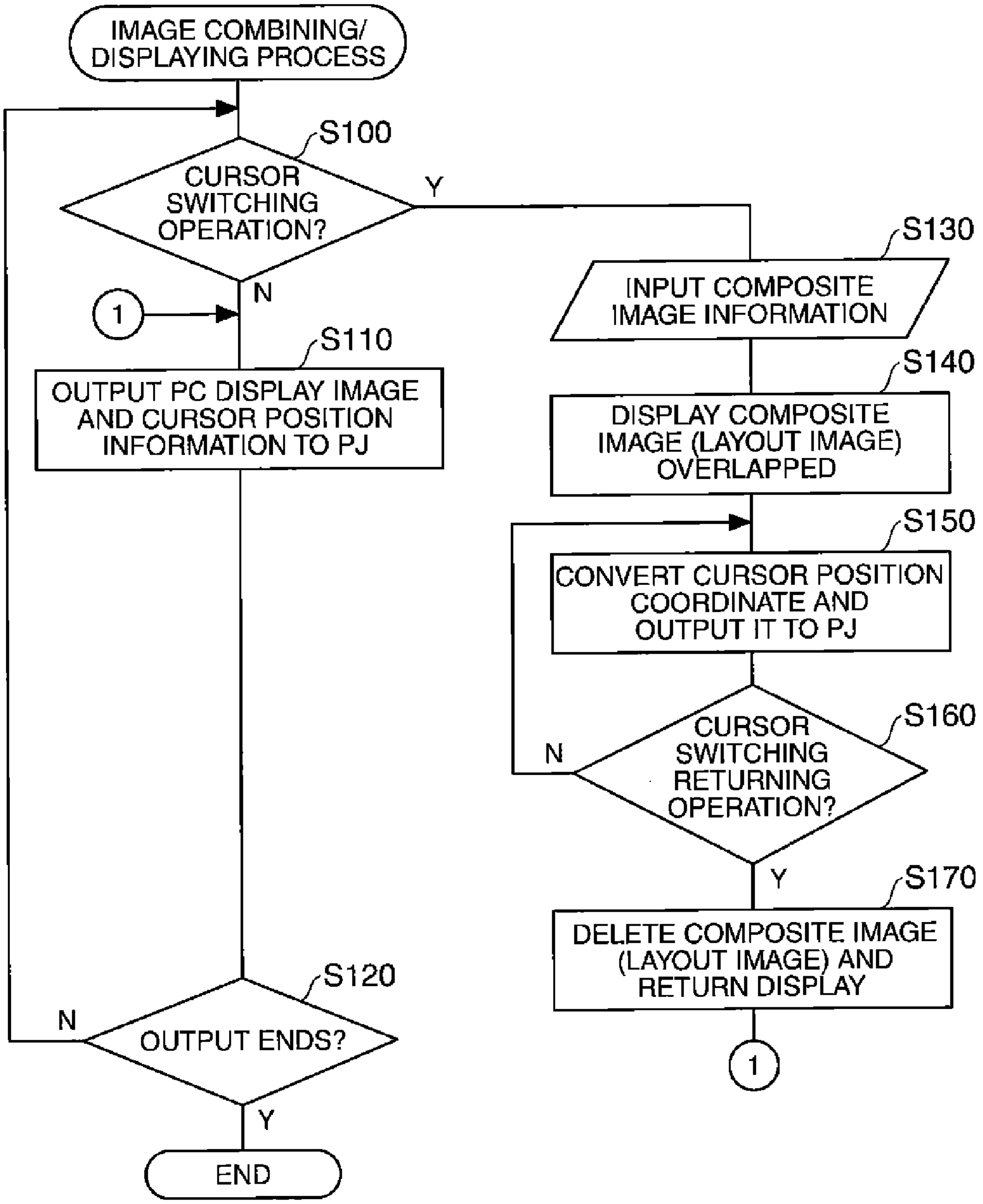
FIG. 3 is a flowchart showing the procedure of an image combining/displaying process performed by a projector 100 and a PC in cooperation with each other.
Figure 4:
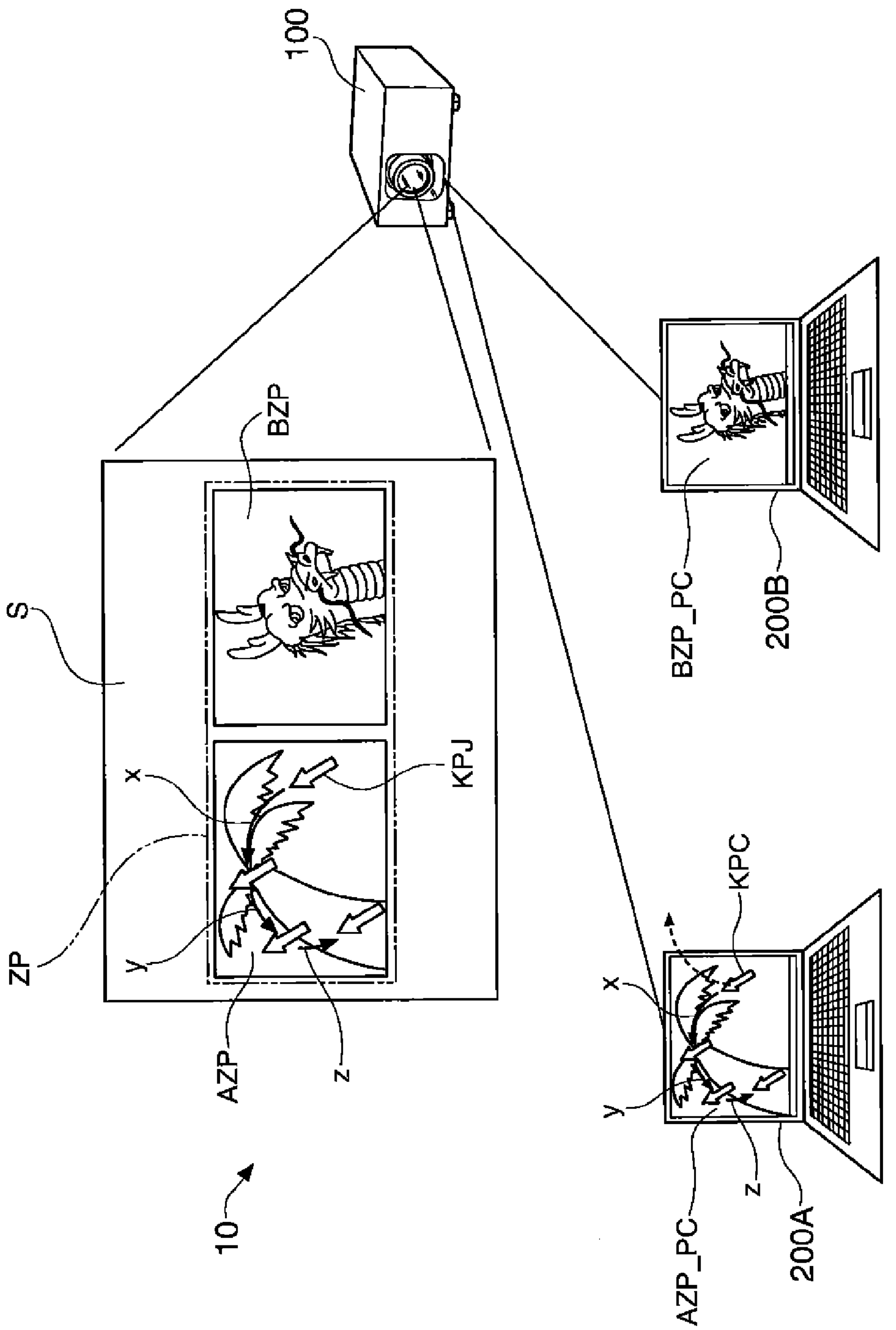
FIG. 4 is an explanatory diagram for explaining how the cursor display is performed in a first cursor display mode in the image combining/displaying process.
Figure 5:
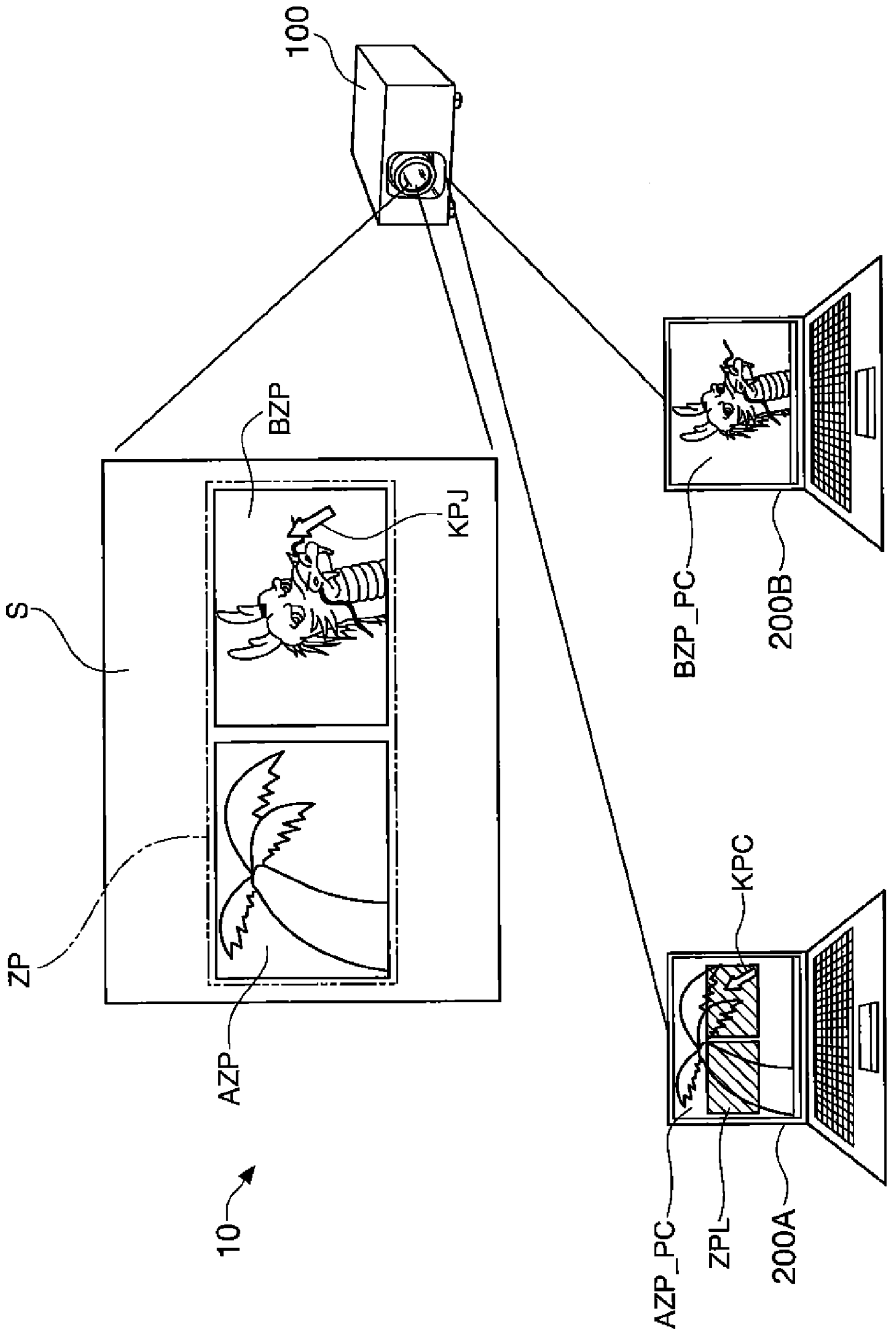
FIG. 5 is an explanatory diagram for explaining how the cursor display is performed in a second cursor display mode in the image combining/displaying process.

Then, the image combining/displaying process including the cursor display in the composite image ZP in the image display system 10 described above will be explained. FIG. 3 is a flowchart showing the procedure of the image combining/displaying process performed by the projector 100 and the PCs in cooperation with each other, FIG. 4 is an explanatory diagram for explaining how the cursor display is performed in a first cursor display mode in the image combining/displaying process, and FIG. 5 is an explanatory diagram for explaining how the cursor display is performed in a second cursor display mode in the image combining/displaying process.

In the image combining/displaying process shown in the drawing, whether or not a cursor switching operation is performed by the user in the PC 200A provided with priority in cursor display is determined (step S100).

In the period before the determination is made, the projector 100 receives the input of the PC image AZP_PC and the PC image BZP_PC from the PC 200A and the PC 200B, respectively, then combines these images, and then keeps the composite image ZP having the reflection image AZP and the reflection image BZP, which reflect the respective images, arranged laterally side by side displayed on the screen S. If no cursor switching operation is performed while keeping the composite image ZP displayed (N in step S100), the PC 200A provided with priority in cursor display outputs (step S110) the cursor coordinate in the display screen attached to the PC as the cursor position information to the projector 100 together with the image information of the PC display image (the PC image AZP_PC).

The projector 100 receiving the input displays the cursor KPJ within the display range the reflection image AZP occupies in the composite image ZP having the reflection image AZP and the reflection image BZP, which reflect the PC display images (the PC image AZP_PC and the PC image BZP_PC) from the respective PCs, arranged laterally side by side. Since the projector 100 receives the input of the PC image AZP_PC and the cursor position information including the cursor coordinate forming a pair together with the PC image from the PC 200A, the display of the cursor KPJ within the display range occupied by the reflection image AZP in the composite image ZP is performed without any problem. On this occasion, if the reflection image AZP is obtained by, for example, zooming the PC image AZP_PC when performing the combining/displaying process for forming the composite image ZP described above, the cursor coordinate conversion corresponding to the combining/displaying process is performed in the projector 100, specifically in the picture output combining section 120 and the cursor processing section 130.

As described above, in the condition in which no cursor switching operation is performed by the user in the PC 200A, if the user performs the cursor operation in the display screen attached to the PC 200A (see the cursor trajectory x→y→z shown in FIG. 4), the cursor is displayed while moving so as to follow the cursor operation in a similar manner in both of the display screen attached to the PC 200A and the display range occupied by the reflection image AZP in the composite image ZP. This cursor display mode corresponds to the first cursor display mode for displaying the cursor KPJ in the display range of the reflection image AZP reflecting the PC image AZP_PC with respect to the PC 200A outputting the cursor position information so as to overlap the composite image ZP. The cursor display in the projector 100 in the first cursor display mode continues (step S120) until the termination output of the image display is made. It should be noted that if the PC image AZP_PC is changed in the PC 200A, the reflection image AZP (the changed image) reflecting the PC image AZP_PC thus changed is displayed in the composite image ZP, and it results that the cursor KPJ is displayed in the display range of the reflection image AZP thus changed.

On the other hand, if it is determined in the step S100 that the cursor switching operation is performed by the user in the PC 200A, the following process, namely the process on and after step S130, is performed. In the present embodiment, the cursor switching operation by the user is defined as follows. As shown in FIG. 4, if it is detected that the user intends to move the cursor KPC, which is displayed so as to overlap the PC image AZP_PC in the PC 200A, in a direction from the inside of the screen area to the outside of the area with the mouse operation, the PC 200A determines that the cursor switching operation has been performed by the user. This determination can be made based on the transition of the calculated coordinate by the cursor coordinate calculation section 240A of the PC 200A. Besides the above, it is also possible to determine whether or not the cursor switching operation has been performed by the user by presence or absence of the key operation of a predetermined key or a predetermined combination of a plurality of keys of the keyboard of the PC 200A.

In the step S130 following the positive determination of the cursor switching operation by the user described above, the following process will be performed by the PC 200A and the projector 100. The PC 200A having determined the cursor switching operation by the user outputs the signal (hereinafter referred to as a cursor switching signal) representing the fact that the cursor switching operation has been performed to the projector 100 via the PJ cursor coordinate output section 260A in the step S130. The projector 100 recognizes the cursor switching signal as a selection command (a mode selection command) for performing the switch from the first cursor display mode to the second cursor display mode, and in response to the command, the projector 100 firstly outputs the composite image information (the layout image information described above, in the present embodiment) for displaying the composite image ZP to the PC 200A via the composite image information output section 140 in the step S130, and the PC 200A inputs the layout image information with the composite image information input section 280A.

In the subsequent step, namely the step S140, the PC 200A displays the layout image ZPL based on the layout image information thus input, as shown in FIG. 5, on the display screen attached so as to overlap the PC image AZP_PC. After then, the PC 200A outputs (step S150) the cursor position information to be output to the projector 100 together with the image information of the PC image AZP_PC as the cursor position information obtained by performing the coordinate conversion on the cursor position. The coordinate conversion is performed by the PJ cursor coordinate output section 260A of the PC 200A, and corresponds to the conversion of the cursor coordinate of the cursor KPC in the PC image AZP_PC displayed on the display screen attached to the PC into the cursor coordinate in the layout image ZPL. On this occasion, since it results that the coordinate conversion is performed in consideration of the aspect ratio of the PC image AZP_PC and the aspect ratio of the layout image ZPL, and further such a coordinate conversion is easy to perform, it also becomes easy to make the cursor position information correspond to the layout image ZPL.

The projector 100 having received the input of the cursor position information on which the coordinate conversion has been performed performs the cursor display based on the cursor position information thus input, and on which the coordinate conversion has been performed, while displaying the composite image ZP having the reflection image AZP and the reflection image BZP, which reflect the PC display images (the PC image AZP_PC and the PC image BZP_PC) from the respective PCs, arranged laterally side by side. Therefore, the display position of the cursor KPJ displayed so as to overlap the composite image ZP becomes the same as the display position of the cursor KPC in the layout image ZPL in the PC 200A. Further, when the user moves the cursor KPC by the mouse operation within the display range of the layout image ZPL of the PC 200A, the coordinate conversion described above is performed on the cursor position information following the cursor movement, and then the cursor position information is output to the projector 100. Therefore, in the projector 100, the cursor KPJ is displayed while moving in the display range of the composite image ZP so as to follow the mouse operation by the user in the PC 200A. Specifically, after the cursor switching operation has been performed by the user in the PC 200A, if the user performs the cursor operation within the display range of the layout image ZPL in the display screen attached to the PC 200A, the cursor is displayed while moving so as to follow the cursor operation in a similar manner in both of the display screen attached to the PC 200A and the composite image ZP. This cursor display mode corresponds to the second cursor display mode for displaying the cursor KPJ within the entire display range of the composite image ZP combined and displayed by the projector 100 so as to overlap the composite image ZP.

The cursor display in the projector 100 in the second cursor display mode continues (step S160) until the cursor switching returning operation is performed by the user. For example, when the cursor switching returning is selected (Y in the step S160) by the predetermined key operation by the user in the PC 200A or the fact that the user displays the cursor KPC outside the display area of the layout image ZPL with the mouse operation, the PC 200A deletes the layout image ZPL having been displayed until then to return (step S170) to the state of displaying the PC image AZP_PC alone, and then the process proceeds to the step S110. Thus, the first cursor display mode is selected, and the cursor display in the projector 100 described above is performed in that mode. If the cursor switching returning is not selected in the step S160 (N in the step S160), then the process proceeds to the step S150 to continue the second cursor display mode.

In the image display system 10 according to the present embodiment described hereinabove, the image information for displaying the PC image AZP_PC and the PC image BZP_PC of the PC 200A and the PC 200B is output from the respective PCs to the projector 100 included therein (the PJ picture output section 270A in FIG. 2). In the projector 100, the image information of the both PCs is received by the picture input processing section 110, then the predetermined combining/displaying process is performed on the information of the both of the images, then the composite image ZP having the reflection image AZP reflecting the PC image AZP_PC and the reflection image BZP reflecting the PC image BZP_PC combined so as to be arranged side by side is generated, and then the composite image ZP thus generated is displayed on the screen S. Then, when performing the cursor display overlapping such a composite image ZP by the projector 100, the projector 100 receives the cursor position information necessary for the cursor display from the PC 200A, and then selects (step S100) either one of the cursor display in the first cursor display mode and the cursor display in the second cursor display mode based on the mode selection command with the cursor switching signal generated by the user performing the mouse operation in the PC 200A, and then the cursor is displayed in the selected display mode so as to overlap the composite image ZP.

Further, if the first cursor display mode is selected, the projector 100 displays the cursor KPJ within the PC image AZP_PC regarding the PC 200A, specifically the display range of the reflection image AZP reflecting the PC image, so as to overlap the composite image ZP by the process of the step S110. In the display of the cursor KPC in the PC 200A, the cursor KPC is displayed within the display range of the PC image AZP_PC so as to overlap the PC image. Therefore, in the first cursor display mode (step S110), it is possible to make the cursor display based on the mouse operation by the user in the PC 200A and the cursor display in the composite image ZP in the projector 100 the same in the cursor display position and how the cursor moves. Therefore, in the case in which the user of the PC 200A acts as the presenter to display the composite image ZP of the PC image AZP_PC displayed by the PC 200A and the PC image BZP_PC of another PC 200B with the projector 100 by projection while operating the PC 200A, thereby to present the composite image ZP to the audience, it is possible to reproduce the cursor movement on the display screen attached to the PC 200A on the display range of the reflection image AZP in the composite image ZP, and therefore, the effectiveness of the presentation can be enhanced.

On the other hand, if the second cursor display mode is selected, the cursor KPJ is displayed within the entire display range of the composite image ZP combined and displayed by the projector 100 so as to overlap the composite image ZP. Therefore, in the case in which the user of the PC 200A shows the composite image ZP of the projector 100 to the audience while operating the PC 200A as the presenter, it is possible for the user to reproduce the cursor movement on the display screen attached to the PC 200A the user his or herself operates also in the display range of the reflection image BZP reflecting the PC image BZP_PC of another PC 200B in the composite image ZP, and therefore, the effectiveness of the presentation can be enhanced. Moreover, since the first and second cursor display modes can arbitrarily be used by the selection thereof, according to the image display system 10 of the present embodiment, it is possible to provide the cursor display and the display mode selection fitting in the intention of the user in addition to the improvement in the diversity in the cursor display for displaying the cursor KPJ so as to overlap the composite image ZP of the projector 100, and the cursor operability.

Further, in the image display system 10 according to the present embodiment, the selection of the cursor display mode can be easily performed by the mouse operation by the user shown in FIG. 4. In addition thereto, since it is enough for the user to move the cursor KPC in the direction from the inside the screen area to the outside thereof by the mouse operation, the selection operation becomes easier. Further, since the cursor movement operation can be an operation fitting in the intention of the display mode switching, the operability of the cursor can be enhanced with high effectiveness.

Further, in the image display system 10 according to the present embodiment, when performing the cursor display in the second cursor display mode, the image information for displaying the layout image ZPL corresponding to the composite image ZP is output from the side of the projector 100 to the PC 200A, and the PC 200A displays (step S140) the layout image ZPL so as to overlap the own PC image AZP_PC. Therefore, it is possible for the user to reproduce the cursor display by the cursor operation in the composite image ZP as describe above by performing the cursor operation while watching the layout image ZPL of the PC 200A having received the output of the composite image information of the layout image ZPL, and therefore, it is possible to make the cursor operation fit in the intention of the user, thereby further enhancing the operability.

Figure 6:
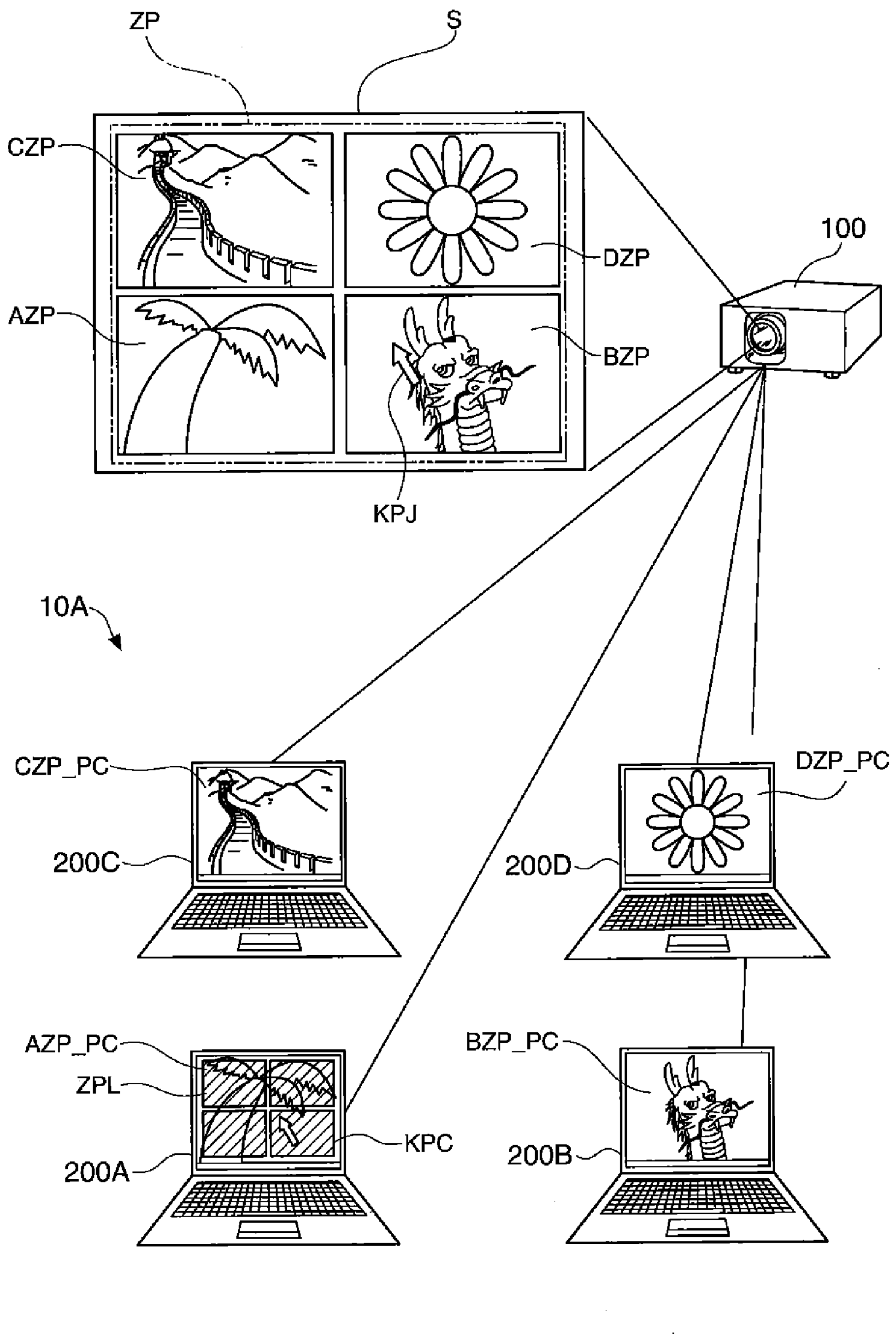
FIG. 6 is an explanatory diagram schematically showing an overall configuration of an image display system 10A of a modified example.

Although the embodiment of the invention is hereinabove explained, the invention is not limited to the embodiment described above, but can be put into practice in various forms within the scope or the spirit of the invention. For example, although the image display system having the configuration in which the two PCs are connected to the projector 100 is explained in the embodiment described above, the invention is not limited thereto. FIG. 6 is an explanatory diagram schematically showing an overall configuration of an image display system 10A of a modified example. As shown in FIG. 6, it is also possible to connect four PCs 200A through 200D to the projector 100, and to display the composite image ZP obtained by combining the PC images AZP_PC through DZP_PC of the respective PCs in a 2×2 matrix in the projector 100. According also to this modified example, the advantages described above can be obtained.

Besides the above, the invention can also be applied to a multi-monitor system provided with a plurality of liquid crystal monitors arranged, and a control device for displaying the PC image AZP_PC from the PC 200A and so on to each of the monitors. Further, although in the embodiment described above the projector 100 and the PCs 200A and so on are connected to each other directly, it is also possible to connect them indirectly via a network capable of performing bidirectional data communication. In this case, it is sufficient to designate the destination of the image information and so on. Further, besides the PCs 200A or the like, other image information processing devices can also be used providing that the devices are capable of displaying the image and the cursor, and generating and outputting the image information for image display and the cursor position information for cursor display.

Further, although in the present embodiment the 200A is used for outputting the cursor position information, it is also possible to arrange that the own cursor position information is output from another PC 200B to the projector 100. In this case, it is possible to treat the position information as valid in the order of input of the cursor position information. Further, it is also possible to display a plurality of cursors in the composite image ZP based on the cursor position information with respect to all of the PCs without prioritizing the cursor position information from the respective PCs, and to display each of the cursors either of the first and second cursor display modes.

What is claimed is:

1. An image display system comprising:
- an image display device adapted to display a composite image having a plurality of images combined; and
- at least one image information processing device adapted to output image information for image display to the image display device,
- wherein the image display device includes
  - a display side input section adapted to receive a plurality of inputs of image information from the at least one image information processing device adapted to output the image information for the image display and at least one input of cursor position information necessary for displaying a cursor from the at least one of image information processing device,
  - an image combining/displaying section adapted to create a composite image based on the image information inputs received by the display side input section, and display the composite image, and
  - a cursor display section adapted to perform display of the cursor based on the cursor position information input received by the display side input section,
- the image information processing device includes
  - an output section adapted to output the cursor position information necessary for displaying the cursor in the image display device to the display side input section of the image display device together with the image information,
  - a processing side input section adapted to receive an input of composite image information with respect to the composite image created by the image display device with the image combining/displaying section, and
  - a cursor position information processing section adapted to select either of a first cursor correspondence process adapted to make the cursor position information correspond to an image based on the image information output to the image display device and a second cursor correspondence process adapted to make the cursor position information correspond to the composite image based on the composite image information input, and perform the selected correspondence process when outputting the cursor position information to the image display device, and
- the cursor display section of the image display device displays
  - the cursor in a first display mode of displaying the cursor in a display range of an image based on the image information from the image information processing device in an overlapping manner when the cursor position information by the first cursor correspondence process is input, and
  - the cursor in a second display mode of displaying the cursor in a display range of the entire composite image in an overlapping manner when the cursor position information by the second cursor correspondence process is input; wherein
- the composite image includes a display image corresponding to a display of the at least one image information processing devices, and the composite image is displayed on top of the display image corresponding to the display of the at least one image information processing device on the display of the image information processing device when a cursor switching has been performed.

2. The image display system according to claim 1, wherein the display side input section of the image display device receives the image information inputs from the respective image information processing devices.

3. The image display system according to claim 2, wherein the display side input section of the image display device receives the cursor position information input from selected one of the image information processing devices.

4. The image display system according to claim 1, wherein the cursor display section of the image display device performs selection of the display mode based on an instruction of the image information processing device outputting the cursor position information.

5. The image display system according to claim 1, wherein the image combining/displaying section of the image display device outputs composite image information for displaying the composite image to the image information processing device outputting the cursor position information.

6. The image display system according to claim 1, wherein the cursor position information processing section of the image information processing device performs selection between the first cursor correspondence process and the second cursor correspondence process based on an operation of the image information processing device by a user.

7. The image display system according to claim 1, wherein the cursor position information processing section of the image information processing device performs coordinate conversion, which corresponds to comparison between an image based on image information to be output to the image display device and the composite image, on the cursor position information in the first cursor correspondence process, thereby performing the second cursor correspondence process.

8. An image display method in an image display device adapted to display a composite image having a plurality of images combined, the method comprising:

(a) receiving a plurality of inputs of image information from at least one image information processing device adapted to output the image information for the image display and at least one input of cursor position information necessary for displaying a cursor from the at least one of image information processing device;

(b) creating a composite image based on the image information inputs received in step (a);

(c) displaying the composite image;

(d) outputting an composite image information with respect to the composite image combined by the image display device to a processing side input section of the at least one image information processing device adapted to receive the composite image information;

(e) selecting, prior to step (f), either one of a first cursor display mode of displaying the cursor in a display range of an image based on the image information with respect to the image information processing device outputting the cursor position information in an overlapping manner, and a second cursor display mode of displaying the cursor in a display range of the entire composite image in an overlapping manner; and (f) performing the cursor display in the display mode selected in step (e);

wherein the composite image includes a display image corresponding to a display of the at least one image information processing devices, and the composite image is displayed on top of the display image corresponding to the display of the at least one image information processing device on the display of the image information processing device when a cursor switching has been performed.

9. The image display method according to claim 8, wherein in step (a), the image information inputs are received from the respective image information processing devices.

10. The image display method according to claim 8, wherein in step (a), the cursor position information input is received from selected one of the image information processing devices.

11. The image display method according to claim 8, wherein in step (e), selection of the cursor display mode is performed based on an instruction of the image information processing device outputting the cursor position information.

12. The image display method according to claim 8, further comprising:

(g) outputting composite image information for displaying the composite image to the image information processing device outputting the cursor position information.

13. An image information processing method adapted to output image information for image display to an image display device adapted to display a composite image having a plurality of images combined, the method comprising:

(p) outputting the cursor position information necessary for displaying a cursor in the image display device to the image display device together with the image information;

(q) receiving, from the image display device, an input of composite image information with respect to a composite image combined by the image display device based on a plurality of image information inputs received by the image display device from at least one image information processing device;

(r) selecting, upon outputting the cursor position information to the image display device, either of a first cursor correspondence process adapted to make the cursor position information correspond to an image based on the image information output to the image display device and a second cursor correspondence process adapted to make the cursor position information correspond to the composite image based on the composite image information input; and (s) performing the cursor correspondence process selected in step (r);

wherein the composite image includes a display image corresponding to a display of the at least one image information processing devices, and the composite image is displayed on top of the display image corresponding to the display of the at least one image information processing device on the display of the image information processing device when a cursor switching has been performed.

14. The image information processing method according to claim 13, further comprising:

(t) detecting a switching operation performed by a user, wherein in step (r), either of the first cursor correspondence process and the second cursor correspondence process is selected based on the switching operation detected in step (t).

15. The image information processing method according to claim 13, wherein in step (r), coordinate conversion, which corresponds to comparison between an image based on image information to be output to the image display device and the composite image, is performed on the cursor position information in the first cursor correspondence process, thereby performing the second cursor correspondence process.

16. The image display system according to claim 1, wherein the composite image includes a display image corresponding to a display of the at least one image information processing device, and the image information processing device displays a layout image of the composite image on the display according to the received input of composite image information.

17. The image information processing method according to claim 13, further including:

displaying, by the image information processing device, a layout image of the composite image on the display according to the received input of composite image information, the composite image including a display image corresponding to a display of the at least one image information processing device.

* * * * *